US011169899B2

(12) United States Patent
Bazzi et al.

(10) Patent No.: US 11,169,899 B2
(45) Date of Patent: Nov. 9, 2021

(54) MITIGATING DATA OFFSETS FOR MACHINE LEARNING

(71) Applicants: Toyota Motor Engineering & Manufacturing North America, Inc., Plano, TX (US); University of Connecticut, Farmington, CT (US)

(72) Inventors: Ali M. Bazzi, South Windsor, CT (US); Lingyi Zhang, Willington, CT (US); Weiqiang Chen, Willington, CT (US); Krishna Pattipati, Storrs, CT (US); Donald McMenemy, Willington, CT (US); Shailesh Joshi, Ann Arbor, MI (US)

(73) Assignees: Toyota Motor Engineering & Manufacturing North America, Inc., Plano, TX (US); University of Connecticut, Farmington, CT (US)

(*) Notice: Subject to any disclaimer, the term of this patent is extended or adjusted under 35 U.S.C. 154(b) by 274 days.

(21) Appl. No.: 16/383,944

(22) Filed: Apr. 15, 2019

(65) Prior Publication Data
US 2020/0327033 A1 Oct. 15, 2020

(51) Int. Cl.
*G06F 11/34* (2006.01)
*G06N 20/00* (2019.01)
*G06F 11/07* (2006.01)
*G05B 23/02* (2006.01)

(52) U.S. Cl.
CPC ...... *G06F 11/3452* (2013.01); *G05B 23/0232* (2013.01); *G06F 11/076* (2013.01); *G06N 20/00* (2019.01)

(58) Field of Classification Search
CPC .... G06F 11/076; G05B 23/0232; G06N 20/00
See application file for complete search history.

(56) References Cited

U.S. PATENT DOCUMENTS 7,949,497 B2 * 5/2011 Yuan .................. G05B 23/0232
702/185
8,981,783 B2 * 3/2015 Fujimatsu .......... G01R 31/3835
324/434
9,081,658 B2 7/2015 Park et al.
(Continued)

FOREIGN PATENT DOCUMENTS

CA 2281672 A1 * 9/1998 ............. H04L 69/40

*Primary Examiner* — Matthew M Kim
*Assistant Examiner* — Matthew N Putaraksa
(74) *Attorney, Agent, or Firm* — Oblon, McClelland, Maier & Neustadt, L.L.P.

(57) ABSTRACT

To predict a failure condition in a power module of a vehicle, it is determined whether a discontinuity in statistical data characterizing physical measurements of the power module meets a threshold criterion. Responsive to the discontinuity meeting the threshold criterion, a data offset in the physical measurements is computed at the discontinuity. A shift correction is applied to the physical measurements in accordance with the computed data offset responsive to a determination that the discontinuity is attributable to a restart of the power module. Other statistical data characterizing the shift-corrected physical measurements are computed and the statistical data and the other statistical data are provided to a machine learning processor that predicts the failure condition in the power module.

12 Claims, 8 Drawing Sheets

(56) References Cited

U.S. PATENT DOCUMENTS

| | | | |
|---|---|---|---|
| 9,607,128 B2 | 3/2017 | Kurnik | |
| 9,719,366 B2 | 8/2017 | Yu et al. | |
| 10,009,551 B1* | 6/2018 | Adcock | H04N 5/265 |
| 10,467,132 B1* | 11/2019 | Chatterjee | G06Q 10/0639 |
| 2013/0018232 A1* | 1/2013 | D'Souza | A61N 5/1049 |
| | | | 600/300 |
| 2014/0136690 A1* | 5/2014 | Jain | H04L 41/5012 |
| | | | 709/224 |
| 2014/0212917 A1* | 7/2014 | Durack | G01N 15/1429 |
| | | | 435/34 |
| 2014/0298097 A1 | 10/2014 | Illouz et al. | |
| 2018/0348717 A1* | 12/2018 | Zhao | G05B 17/02 |
| 2018/0359165 A1* | 12/2018 | Frydman | G01S 13/765 |
| 2019/0228829 A1* | 7/2019 | Hiraga | G11C 29/32 |

\* cited by examiner

MITIGATING DATA OFFSETS FOR MACHINE LEARNING

BACKGROUND

Power electronics modules that provide electrical power to automotive vehicles typically operate at high power densities and high temperature conditions; hence the power electronics modules undergo degradation or an aging process. Modern automotive designs seek to monitor critical components such as power electronics modules and alert drivers when such a system is about to fail (e.g. bond wire failure, die attach failure, substrate delamination, etc.). The failure condition may manifest itself as an anomaly in sensor data. However, similar anomalies may appear in the data for other attributable reasons, such as power down of the vehicle may allow cooling of a power electronics module causing an offset in temperature between adjacent temperature data points. In certain cases, such a data offset would be erroneously indicated to a user as a component failure (or other indication such as a check engine indicator).

SUMMARY

To predict a failure condition in a power module of a vehicle, it is determined whether a discontinuity in statistical data characterizing physical measurements of the power module meets a threshold criterion. Responsive to the discontinuity meeting the threshold criterion, a data offset in the physical measurements is computed at the discontinuity. This offset is introduced by sensor bias, system reset, and a variety of other reasons. Therefore, a shift correction is applied to the physical measurements in accordance with the computed data offset responsive to a determination that the discontinuity is attributable to a restart of the power module. Other statistical data characterizing the shift-corrected physical measurements are computed and the statistical data and the other statistical data are provided to a machine learning processor that predicts the failure condition in the power module.

DETAILED DESCRIPTION

Figure 1:
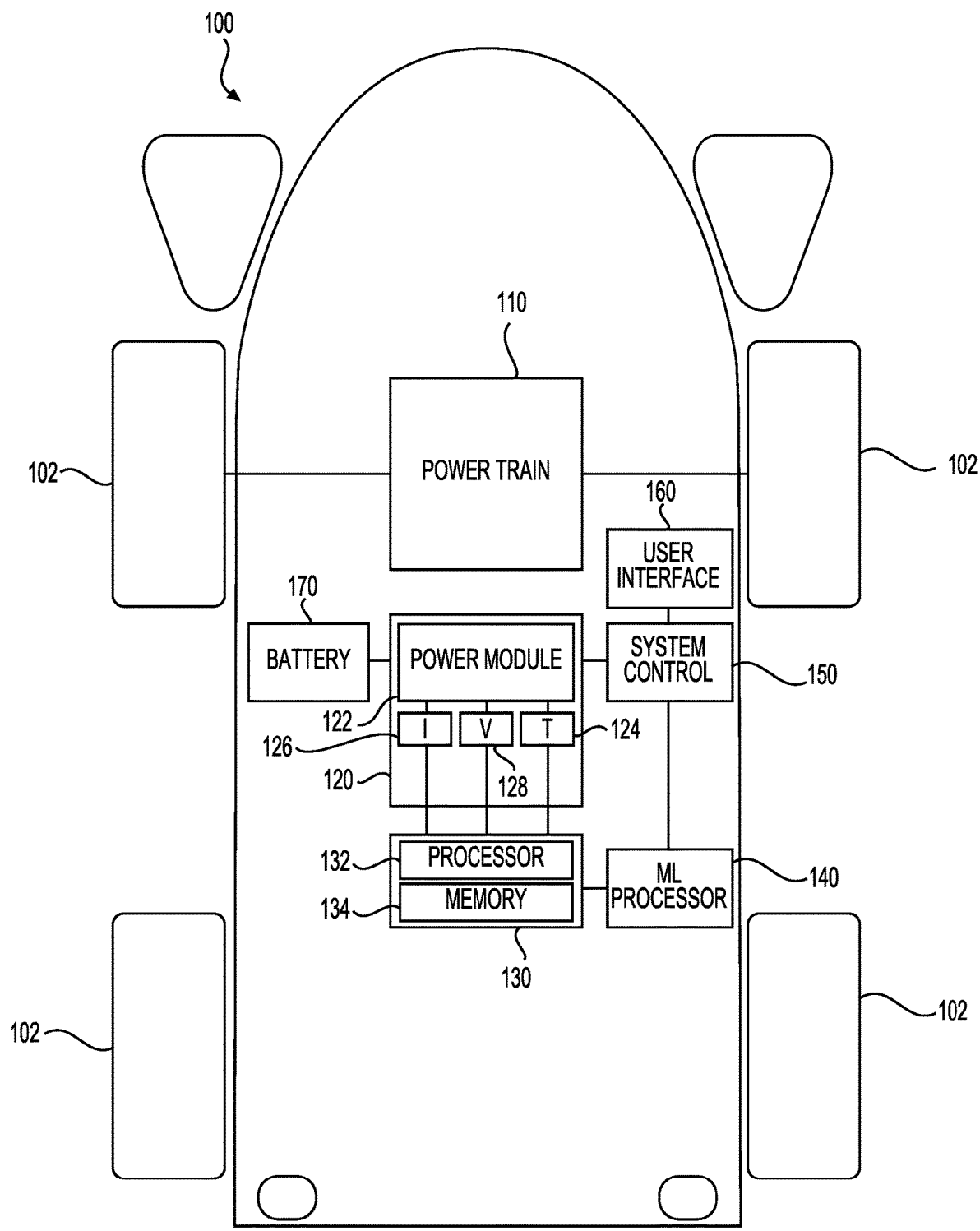
FIG. 1 is a schematic block diagram of a vehicle system 100 in which the present invention can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The present invention makes use of sensor data from an automotive vehicle for classification and prediction of failures in vehicles with power converters or semi-conductor devices. One such technique deployed in embodiments of the present invention is disclosed in U.S. patent application Ser. No. 15/947,702, entitled "Fault Diagnostics in Power Electronics using Adaptive PCA"—incorporated herein by reference in its entirety—which is based on an accelerated aging test. During this test, the output data are recorded continuously until the power electronics module fails. However, the data recorded from an on-vehicle power electronics module are not continuous because the data are only recorded when the vehicle is in a power on state. After shutting down and restarting the vehicle, the data are recorded in different temperature and power density conditions. Hence some offset appears in the data before and after restarting the vehicle. Existing techniques developed for anomaly detection do not work well with data that has an offset, particularly in machine learning applications that train on such offsets for failure prediction. The present invention eliminates such offset so that existing techniques for anomaly detection are effective in on-vehicle power electronics modules.

FIG. 1 is a schematic block diagram of a vehicle system 100 in which the present invention can be embodied. Vehicle system 100 may be a hybrid vehicle system or an electric vehicle system, and may include a plurality of drive wheels 102, a power train 110, a power control unit (PCU) 120, a data processor component 130, a machine learning (ML) processor component 140, a system control unit 150, a user interface 160, and a battery 170.

Power train 110 may include a motor and, in some embodiments, includes a motor/generator unit. In other embodiments, power train 110 may include a motor and an engine. Vehicle system 100 may be driven by a drive force from the power train 110.

PCU 120 controls power supplied to power train 110. Example PCU 120 includes a power module 122 and a plurality of sensors 124, 126, and 128. PCU 120 may also include various other electronic components such as a gate drive hoard, inductors, a DC-DC converter, capacitors, a cooler, etc. Power module 122 may include an inverter that converts the DC from battery 170 into an AC for power train 110 and a DC-DC converter for conversion to 12V. The plurality of sensors 124, 126, and 128 may include, without limitation, a temperature sensor 214 for sensing the temperature of power module 122, a current sensor 126 for sensing an electric current of power module 122, and a voltage sensor 128 for sensing a voltage of the power module 122. Data including the temperature, current, and voltage obtained by the plurality of sensors 124, 126, and 128 is provided to the data processor 130. Other sensors may be utilized in embodiments of the invention as well.

Data processor component 130 includes a processor 132 and a memory 134. Processor 132 may be any device capable of executing machine readable instructions. Accordingly, processor 132 may be a microprocessor, microcontroller, digital signal processor, graphics processor, system on a chip (SOC), or other fixed or programmable logic, that executes instructions for process logic stored in the memory. The processors may themselves be multi-processors, and have multiple CPUs, multiple cores, multiple dies comprising multiple processors, etc. Processor 132 may be communicatively coupled to other components of the vehicle system 100. For example, processor 132 may receive data from PCU 120 and provides processed data to ML processor component 140.

Memory 134 may be non-transitory electronic memory 134 and may comprise RAM, ROM, flash memories, hard drives, or any device capable of storing machine readable instructions such that the machine readable instructions can be accessed and executed by processor 132. The machine readable instructions may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in memory 134. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Memory 134 may store computer readable and executable instructions that, when executed by processor 132, causes data processor component 130 to implement various operations. For example, data processor component 130 may receive data from sensors 124, 126, 128, and may implement operations on the data prior to providing such to ML processor component 140.

ML processor 140 accepts processed data from data processing component 130 and utilizes that data to make predictions of future states of vehicle 100. The processor runs one or more machine learning algorithms. These algorithms are sensitive to data quality, including any offsets in sensor feedback. Machine learning data are summarized using $T^2$ and Q statistics for a model as part of the machine learning algorithm. Given that the machine learning algorithm had used pre-offset data for training, introducing sensor offset will be seen by the algorithm as some kind of failure in the system, and will be flagged as such. One such prediction is the failure of PCU 120, which case is used herein as an example. ML processor 140 may perform other functions as well and the present invention is not limited to particular ML techniques. ML processor 140 may include a processor and a non-transitory memory comparable to the processor 132 and the non-transitory electronic memory 134 of data processor component 130. ML processor component 130 continues to update machine learning data by implementing a machine learning algorithm with data obtained from data processor component 130. The level shifting is a technique to compensate for bias due to turning the system on-off. Based on the machine learning data stored in memory 134, ML processor component 140 predicts the failure of the PCU 120. ML processor component 140 may provide the failure prediction of PCU 120 to system control component 150.

System control component 150 controls the overall system of vehicle system 100 based on input signals from various components of vehicle system 100. For example, the system control component 150 collects input signals from various components of the vehicle system 100, such as power train 110, battery 170, etc. and controls the components based on the collected signals. In some embodiments, system control component 150 may receive data including the temperature, current, and voltage obtained by the plurality of sensors 124, 126, and 128, and may provide the data to data processor component 130. System control component 150 may also control power train 110 by sending a control signal to PCU 120. System control component 150 may include a processor and a non-transitory memory comparable to the processor 132 and the non-transitory electronic memory 134 of data processor component 130.

User interface 160 provides information on failure prediction of the PCU 120 to a user of the vehicle system 100 by displaying information on a display, outputting a sound, or providing tactile feedback. For example, when the user interface 160 receives a signal from the system control component 150 that the failure of PCU 120 is predicted, the user interface 160 may alert the user of the vehicle system 100 by displaying an alert light (e.g., a check engine light) on a dashboard of the vehicle, or making an alert sound.

Battery 170 may be a battery pack constituted of a plurality of cells. Battery 170 may be constituted of a plurality of battery modules connected in series, where the battery modules are each made up of a plurality of cells integrated into the battery module. Battery 170 may be a lithium ion battery.

Figure 2A:
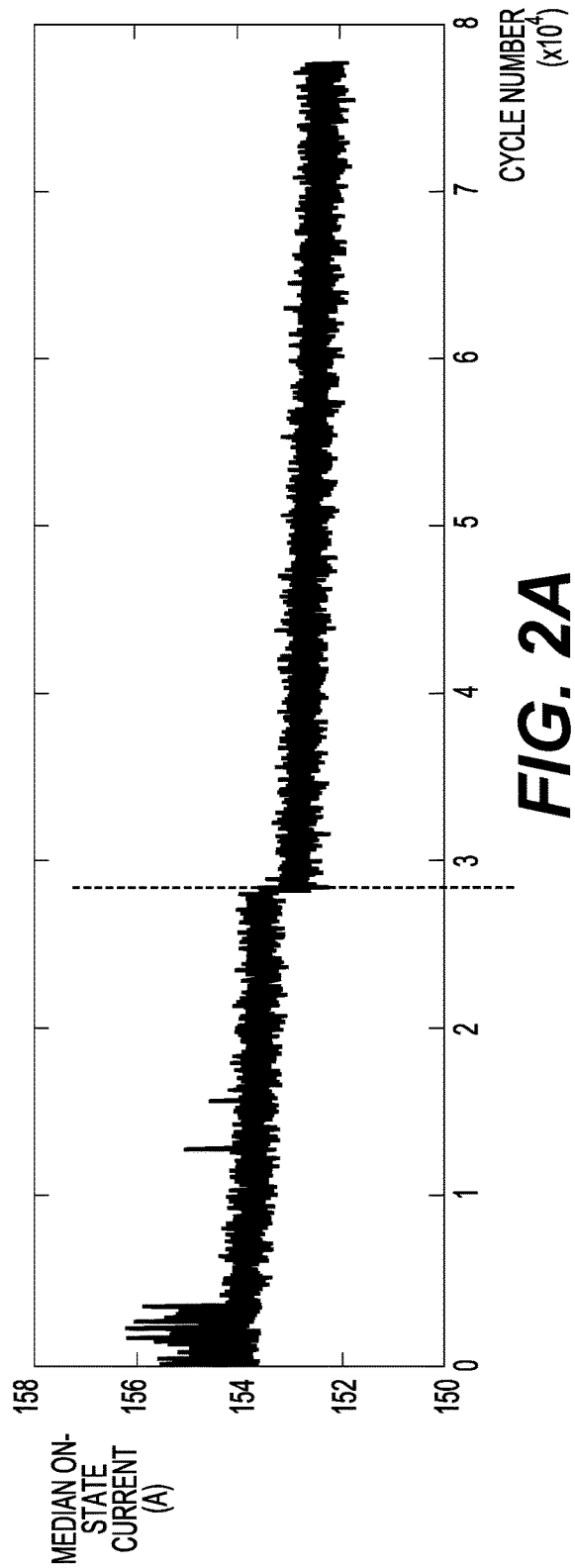
FIGS. 2A and 2B are graphs illustrating the median value of on-state data and a data offset therein.
Figure 2B:
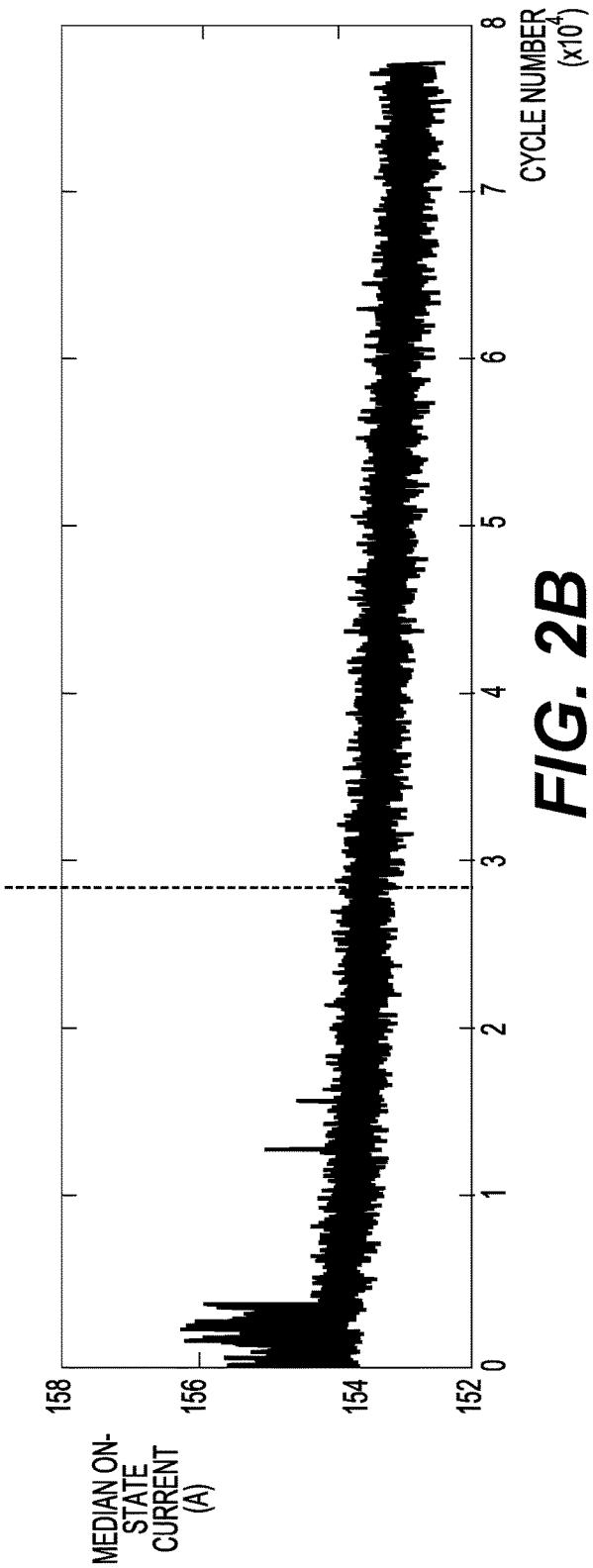

FIGS. 2A and 2B, collectively referred to herein as FIG. 2, are graphs illustrating the median value of on-state data, where the FIG. 2A is the on-state median value of an example power module without applying the level-shift technique described herein. An offset is created at the time of red dotted line, which is caused by restarting the power module after 4 hours of cooling. FIG. 2B shows the on-state median value of power module with level-shift technique applied, where the offset is eliminated.

Figure 3:
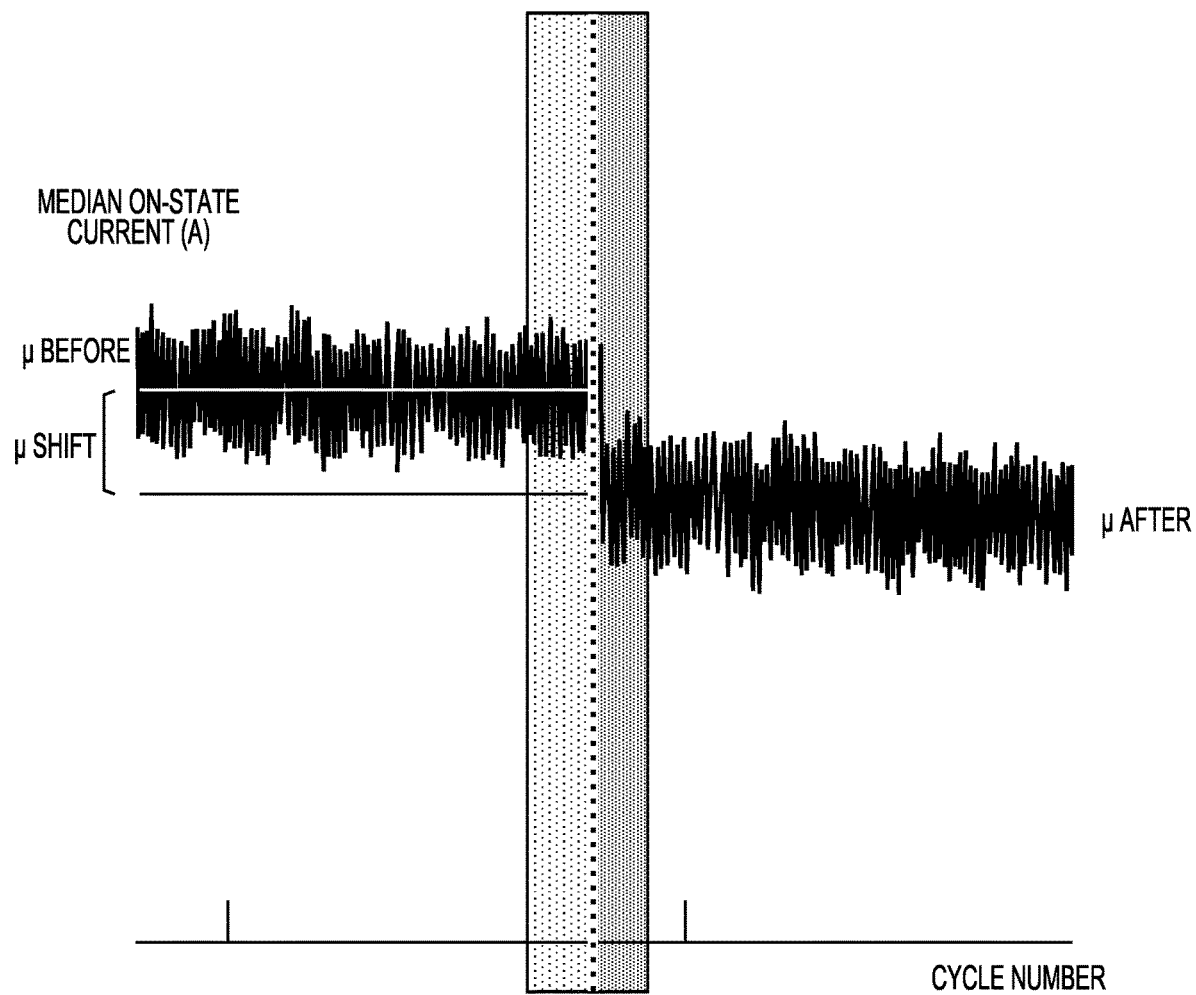
FIG. 3 is an illustration of the discontinuity of FIG. 2A in greater detail.

FIG. 3 is an illustration of the discontinuity of FIG. 2 in greater detail showing median values $\mu_{before}$, $\mu_{after}$ and the data offset. In certain embodiments, the data offset is characterized by median values $\mu_{before}$, $\mu_{after}$. That is, the data offset may be characterized as a difference between the median values before and after the discontinuity, i.e. $\mu_{after} - \mu_{before}$.

Figure 4:
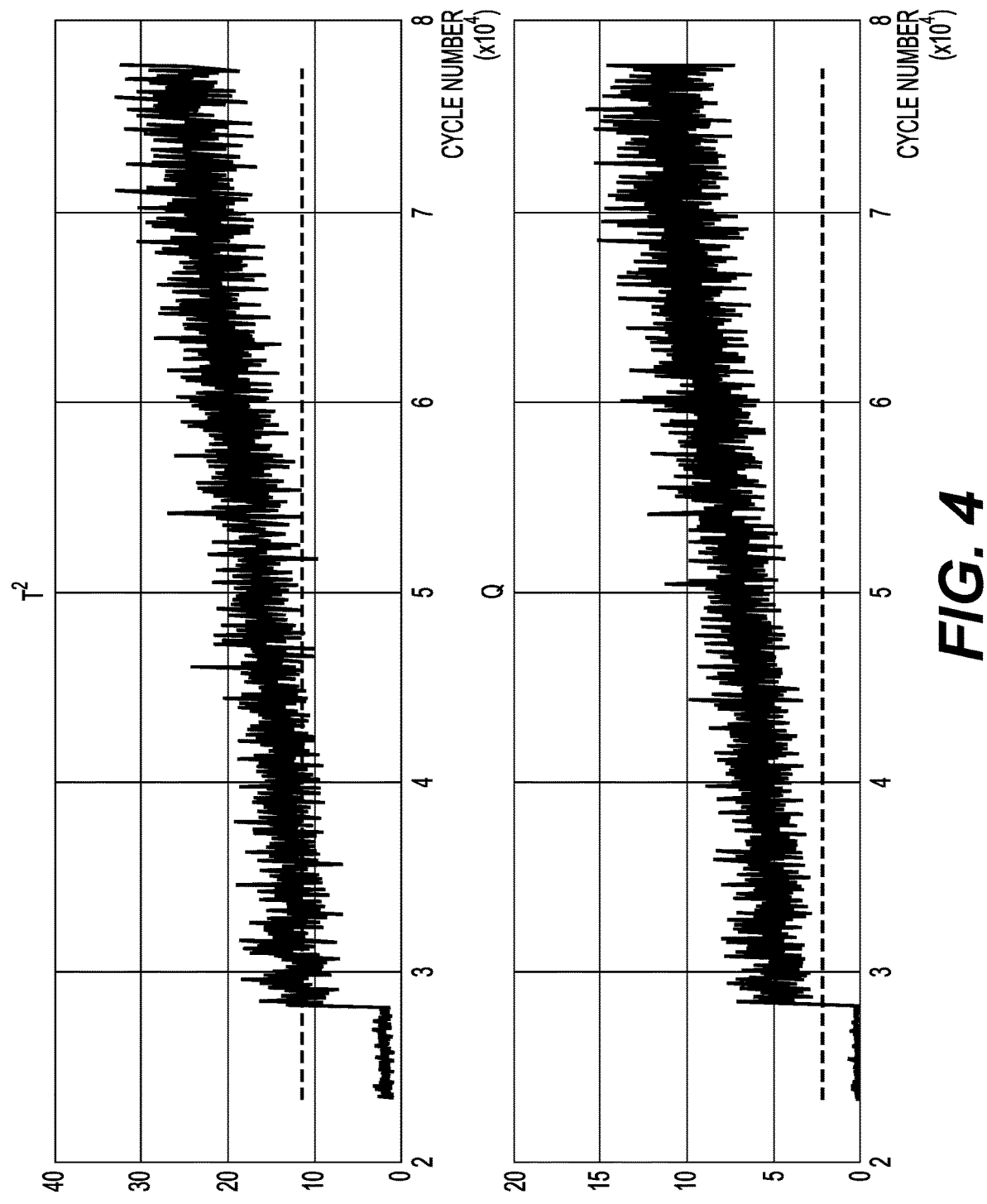
FIG. 4 illustrates $T^2$ and Q statistics after a power module has been in an off state for some period, followed by a period of cooling.
Figure 5:
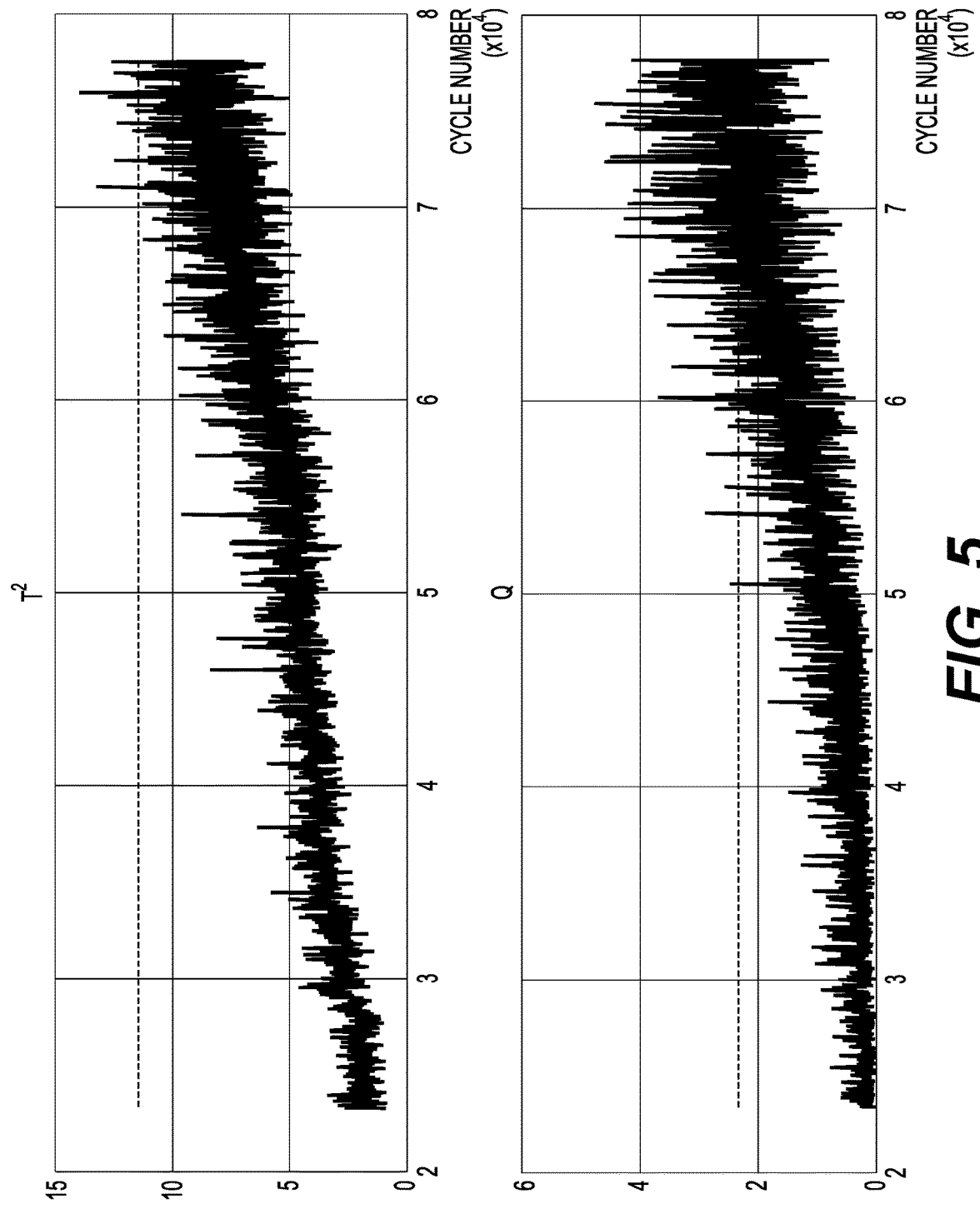
FIG. 5 illustrates $T^2$ and Q statistics after eliminating the offset with the technique described herein.

As explained in the above-cited U.S. patent application Ser. No. 15/947,702, the $T^2$ and Q statistics are internal to the machine learning algorithm. $T^2$ statistic provides information regarding the integrity of system performance, where exceeding a pre-defined threshold implies failure in the system being monitored. Q statistic provides information regarding model validity, where exceeding its pre-defined threshold implies that information learned about the system is no longer valid and retraining is necessary. FIG. 4 shows the $T^2$ and Q statistics after a power module has been in an off state for some period, followed by a period of cooling. The offset in the $T^2$ and Q values exceed a threshold that indicates a failure of the power module, which may not be the case. After eliminating the offset with the technique described herein, the $T^2$ and Q statistics in FIG. 5 are obtained. In FIG. 5, the algorithm does not indicate a failure of device the power module; only an increasing trend of $T^2$ and Q values is observed, which is more reliable for predicting an actual power module failure.

Figure 6:
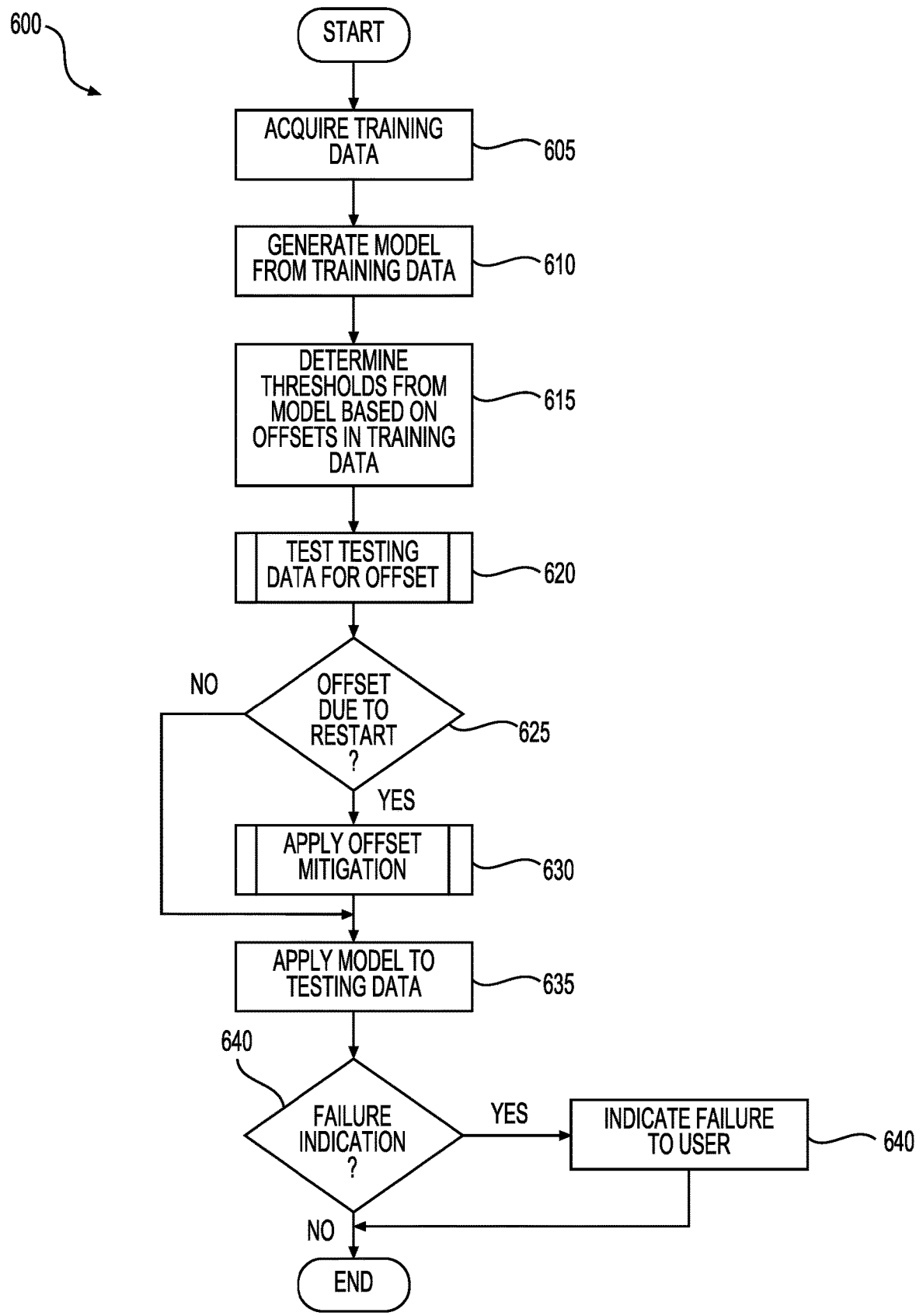
FIG. 6 is a flow diagram of an example failure determination process by which the present invention can be embodied.

FIG. 6 is a flow diagram of an example failure determination process by which the present invention can be embodied. In operation 605, training data are acquired from which a model of an electronic component is generated in operation 610. In operation 615, thresholds are determined from the generated model, which may be based on offsets and other anomalies contained in the training data. In operation 620, which is a subprocess explained in more detail with reference to FIG. 7, testing data are tested for an offset therein. In operation 625, it is determined whether the offset is due to a component restart condition. Such a restart condition may be indicated by determining whether a system shutdown has occurred, e.g., an event defined by the state of the ignition switch. If it is determined that a restart has occurred, such as by evaluating the state of a restart flag, process 600 may transition to operation 630, whereby offset mitigation is performed. Operation 630 is a subprocess explained in more detail with reference to FIG. 8. If a data offset cannot be attributed to a component restart, as determined in operation 625, or after offset mitigation has been performed in operation 630, process 600 may transition to operation 635, whereby the generated model is applied to the testing data. In operation 640, it is determined whether a failure indication is indicated in the data and, if not, the process terminates. If, however, there is a failure indication in the data, as determined in operation 640, process 600 may transition to operation 645, whereby the failure is indicated to a user, such as by illuminating the check engine indicator.

Figure 7:
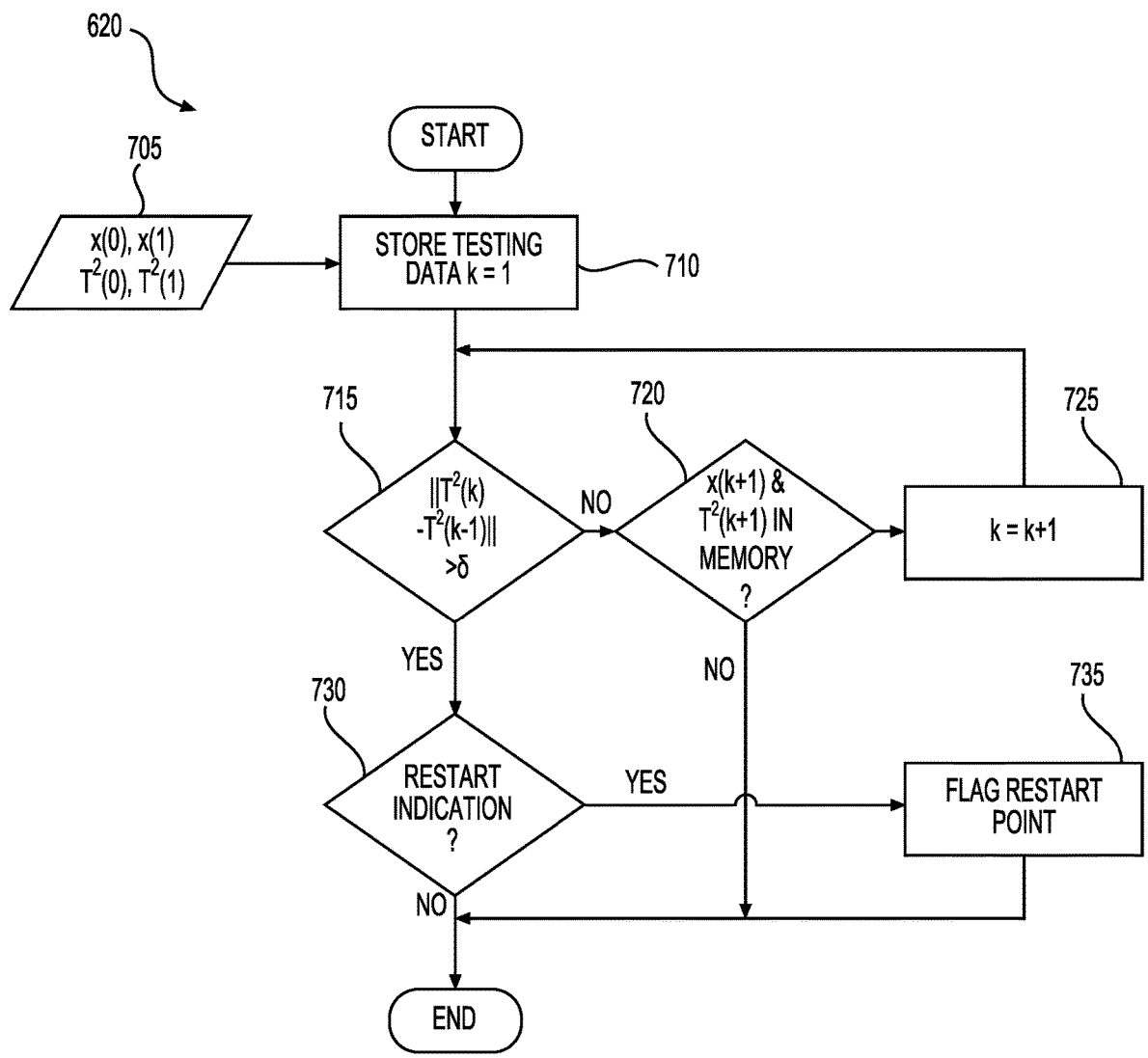
FIG. 7 is a flow diagram of an example data testing process with which the present invention can be embodied.

FIG. 7 is a flow diagram of an example data testing process 620 with which the present invention can be embodied. In operation 710, process is initialized with features $x(0)$, $x(1)$ and the $T^2$ values for these features denoted as $T^2(0)$ and $T^2(1)$ indicated at block 705. In operation 710, testing data are stored and an index k is initialized. Index k functions to point to the location in the stored data to be presently checked for a restart or discontinuous condition. In operation 715, a discontinuity is detected when a difference between consecutive $T^2$ values is greater than a threshold criterion δ, e.g., 99% Chi-squared for one (1) degree of freedom. If the threshold criterion is met, process 620 may transition to operation 730, whereby it is determined whether a restart indication exists. Such restart indication may be determined from past and present states of the vehicle's ignition switch or other techniques by which it is determined whether the monitored component, e.g., a power module, has had power removed therefrom followed by a reapplication of power. For simplicity, the location in the data where the threshold criterion is met will be termed a restart point. If it is determined, in operation 730, that a restart is indicated, process 620 may transition to operation 735, whereby the restart point is flagged and the process is terminated and control is returned to process 600.

If the threshold criterion is not met, as determined in operation 715, and there are no more data points in memory with index larger than k, as determined in operation 720, the process is terminated and control is returned to process 600. If a restart point is detected, and there are more data points with index larger than k in memory, process 620 may transition to operation 725, whereby the index is increased and the difference between $T^2$ values for k and k−1 is compared to the threshold criterion δ operation 715.

Figure 8:
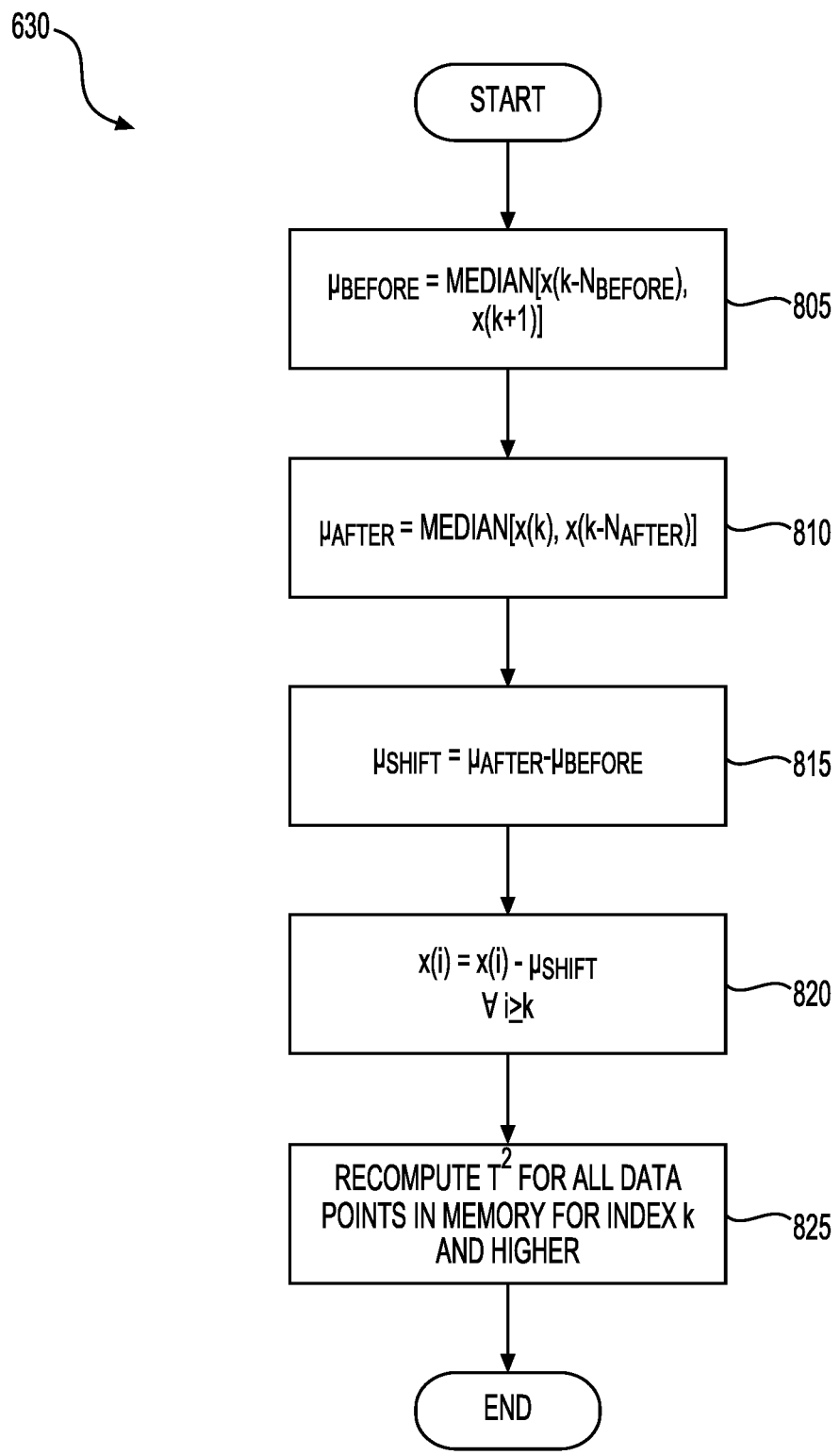
FIG. 8 is a flow diagram of an offset mitigation process by which the present invention can be embodied.

FIG. 8 is a flow diagram of an offset mitigation process 630 by which the present invention can be embodied. In operation 805, whereby the median of $N_{before}$ data points before the restart point is computed. In operation 810, the median of $N_{after}$ points after the restart point is computed. $N_{before}$ and $N_{after}$ are selected from experience and based on data consistency before and after the offset occurs; typically, they are odd numbers. The medians are termed $\mu_{before}$ and $\mu_{after}$ respectively. In operation 815, the level shift is computed as $\mu_{shift}=\mu_{after}-\mu_{before}$ and is applied in operation 820 to each data point in the remaining testing data after the restart point by subtracting the level shift. In operation 825, the $T^2$ values for the level-shifted data is recomputed (i.e., the data points in memory with index k or higher). Process 630 may then terminate, whereby control is passed to process 600.

The present invention uses a level-shifting technique to connect the discontinuous data and remove the impact of different power densities and temperature. Additionally, the proposed invention is not limited to offline training and testing as the structure for real-time implementation is developed. Here, the level-shifting method is suitable for devices which require shut-off and restarting frequently, such as the power electronics module in electrical vehicle.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

Aspects of the present invention are described with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A method of predicting a failure condition in a power module of a vehicle, the method comprising:
   determining whether a discontinuity in statistical data characterizing physical measurements of the power module meets a threshold criterion;
   computing, responsive to the discontinuity meeting the threshold criterion, a data offset in the physical measurements at the discontinuity, including:
      computing a before median value for a predetermined number of physical measurements sequentially preceding the discontinuity and an after median value for a predetermined number of physical measurements sequentially following the discontinuity, and
      computing a difference between the before median value and the after median value as the data offset;
   applying a shift correction to the physical measurements in accordance with the computed data offset responsive to a determination that the discontinuity is attributable to a restart of the power module;
   computing other statistical data characterizing the shift-corrected physical measurements; and
   providing the statistical data and the other statistical data to a machine learning processor that predicts the failure condition in the power module.

2. The method of claim 1, wherein the discontinuity is determined as a difference in consecutive data points.

3. The method of claim 1, wherein applying the shift correction comprises subtracting the data offset from the physical measurements that follow the discontinuity.

4. The method of claim 1, wherein the statistical data and the other statistical data are Hotelling's T-squared statistical data.

5. An apparatus for predicting a failure condition in a power module of a vehicle, the apparatus comprising:
   a processor configured to:
   determine whether a discontinuity in statistical data characterizing physical measurements of the power module meets a threshold criterion;
   compute, responsive to the discontinuity meeting the threshold criterion, a data offset in the physical measurements at the discontinuity, including:
      computing a before median value for a predetermined number of physical measurements sequentially preceding the discontinuity and an after median value for a predetermined number of physical measurements sequentially following the discontinuity, and
      computing a difference between the before median value and the after median value as the data offset;
   apply a shift correction to the physical measurements in accordance with the computed data offset responsive to a determination that the discontinuity is attributable to a restart of the power module;

compute other statistical data characterizing the shift-corrected physical measurements; and provide the statistical data and the other statistical data to a machine learning processor that predicts the failure condition in the power module.

6. The apparatus of claim 5, wherein the discontinuity is determined as a difference in consecutive data points.

7. The apparatus of claim 5, wherein applying the shift correction comprises subtracting the data offset from the physical measurements that follow the discontinuity.

8. The apparatus of claim 5, wherein the statistical data and the other statistical data are Hotelling's T-squared statistical data.

9. A non-transitory tangible computer readable medium having encoded thereon processor instructions that when executed by a processor causes the processor to:

determine whether a discontinuity in statistical data characterizing physical measurements of a power module meets a threshold criterion;

compute, responsive to the discontinuity meeting the threshold criterion, a data offset in the physical measurements at the discontinuity, including:

computing a before median value for a predetermined number of physical measurements sequentially preceding the discontinuity and an after median value for a predetermined number of physical measurements sequentially following the discontinuity, and computing a difference between the before median value and the after median value as the data offset;

apply a shift correction to the physical measurements in accordance with the computed data offset responsive to a determination that the discontinuity is attributable to a restart of the power module;

compute other statistical data characterizing the shift-corrected physical measurements; and provide the statistical data and the other statistical data to a machine learning processor that predicts a failure condition in the power module.

10. The computer readable medium of claim 9, wherein the discontinuity is determined as a difference in consecutive data points.

11. The computer readable medium of claim 9, wherein applying the shift correction comprises subtracting the data offset from the physical measurements that follow the discontinuity.

12. The computer readable medium of claim 9, wherein the statistical data and the other statistical data are Hotelling's T-squared statistical data.

* * * * *